Dec. 28, 1965

W. McADAM 3,226,639

NULL-FLUX TRANSDUCER FOR USE IN ELECTRICAL
MEASURING AND CONTROL SYSTEMS

Filed April 10, 1961

Dec. 28, 1965  W. McADAM  3,226,639
NULL-FLUX TRANSDUCER FOR USE IN ELECTRICAL
MEASURING AND CONTROL SYSTEMS
Filed April 10, 1961  6 Sheets-Sheet 3

United States Patent Office 3,226,639
Patented Dec. 28, 1965

3,226,639
NULL-FLUX TRANSDUCER FOR USE IN ELECTRICAL MEASURING AND CONTROL SYSTEMS
Will McAdam, Blue Bell, Pa., assignor to Leeds and Northrup Company, Philadelphia, Pa., a corporation of Pennsylvania
Filed Apr. 10, 1961, Ser. No. 101,736
17 Claims. (Cl. 324—99)

This invention relates to transducers for use in electrical measuring and control systems and has for an object the provision of a transducer operating on the null-flux principle having a magnetic circuit including input means for producing an M.M.F. to establish a variable flux level in the magnetic circuit and bias means for producing an opposing flux in the magnetic circuit to reduce to zero the net flux level for establishing an input condition to produce a zero output from the transducer. Such input M.M.F. may be produced by an electrical current or a permanent magnet positioned in accordance with an input quantity.

The present invention is an improvement over prior transducers or sensors of the type which operate on a constant value of flux which is other than zero. In such prior sensors, a change of position of the measured variable caused a change of D.C. flux, which in turn caused a change of inductance of a winding on the sensor. The change of inductance was then detected by associated electronic circuits to produce a desired electrical output from a sensor. Since the inductance of the sensor winding was not sensitive to the polarity of the D.C. flux, the reference D.C. flux level was required to be some constant value other than zero to make the inductance changes unambiguous with respect to positive and negative displacements of the input means from a reference position. It has been found that with sensors of the foregoing type that because the reference D.C. flux could not be zero, the sensor was subject to zero-offsets arising from the effects of ambient conditions on the permeabilities of its magnetic parts. While these zero-offsets can be made relatively small by proper selection of materials and conditions of operation, it has been found difficult to reduce them consistently to negligible amounts.

The present invention provides a transducer operating on the null-flux principle, such that the reference D.C. flux level is zero, thereby avoiding any zero-offsets due to permeability changes, since at zero flux, permeability changes have no effect.

In accordance with the invention there is provided a transducer with a magnetic circuit having saturable core means including a ring-shaped portion with a driving winding thereon for periodically saturating the ring-shaped portion. A pair of spaced high permeability pole pieces project from the saturable core means and bias means are associated with the ends of the pair of pole pieces. An output winding is disposed on a portion of the magnetic circuit and a feedback winding is disposed on the pair of pole pieces. The input circuit of amplifying means is connected to the output winding and the output of the amplifying means is connected to the feedback winding.

In one form of the invention, for converting a mechanical position input signal to an electrical signal, a permanent magnet probe is adjustably positioned between the pair of poles and between the bias means. Further in avoidance of zero-offset due to changes of ambient conditions, the permanent magnet probe is utilized to provide not only the input M.M.F. but also the biasing M.M.F. for establishing the zero or reference mechanical input position.

In order to provide the bias M.M.F. from the single source of M.M.F., helical-shaped extensions are employed on the pole pieces which project from the respective ends of the pole pieces and extend around opposite sides of the longitudinal axis between the pair of pole pieces with the distal ends of the extensions being in line with the other of the pole pieces.

For a more detailed disclosure of the invention and for further objects and advantages thereof, reference is to be had to the following description taken in conjunction with the accompanying drawings in which:

FIG. 3A is a diagram useful in explaining the modification shown in FIG. 3;

Figure 1:
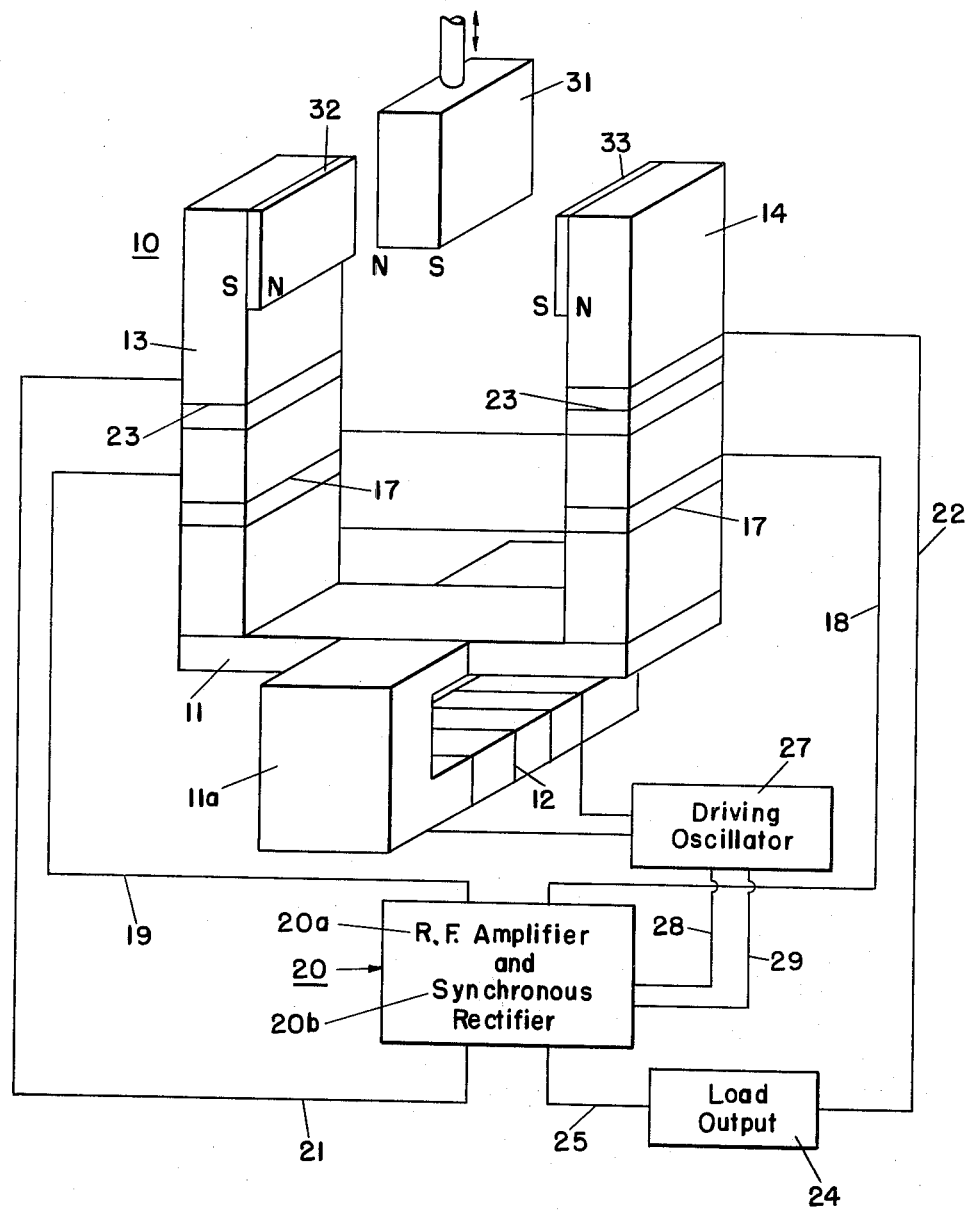
FIG. 1 is a schematic diagram of a transducer embodying one form of the invention.

Referring to FIG. 1 there is illustrated a transducer 10 having a magnetic circuit including a saturable core 11 having a ring-shaped portion 11a on which there is disposed a driving winding 12. A pair of poles 13, 14 project from the saturable core means 11. The poles 13 and 14 may be made from a ferro-magnetic ferrite or they may be made from other materials having higher permeability. Such ferrites, in general, are manufactured by sintering together a mixture of constituents containing an iron compound and one or more further metal compounds, as for example, a mechanical mixture of metal oxides. Such magnetic members contain no metal particles and provide the advantage of poor electrical conductivity, which reduces eddy current losses to a negligible value, while retaining the desired magnetic characteristics. The poles 13 and 14 are provided with an A.C. output winding 17 which is connected by way of conductors 18 and 19 to the input of an RF amplifier 20a and synchronous rectifier 20b schematically indicated by rectangle 20. One side of the output from the RF amplifier and synchronous rectifier 20 is connected by way of conductor 21 to one end of a D.C. feedback winding 23 on the poles 13 and 14. The other end of the feedback winding 23 is connected by way of conductor 22 to a load output 24, the other side of which is connected to the other side of the output of the RF amplifier and synchronous rectifier 20 by conductor 25. The driving winding 12 is connected to a driving oscillator 27 which is connected by way of conductors 28 and 29 to the synchronous rectifier portion 20b of rectangle 20.

The input means for producing an M.M.F. to establish a variable flux level in the magnetic circuit has been illustrated in the form of a permanent magnet probe 31 which is positioned between the ends of the poles 13 and 14 and is movable along the longitudinal axis between the pair of poles in accordance with a mechanical input signal such as from a Bourdon tube, a diaphragm, a motor or other suitable means. The permanent magnet 31 is poled, as shown in FIG. 1, so that the north pole is adjacent the face of pole 13 and the south pole is adjacent the face of pole 14. To establish a zero reference position for the permanent magnet 31, the poles 13 and 14 are each provided with bias means illustrated in the form of permanent magnets 32 and 33 fixed to the respective faces of the poles 13 and 14. It will be noted that the bias magnet 32 has its north pole adjacent the north pole of permanent magnet 31 and the bias magnet 33 has its south pole adjacent the south pole of permanent magnet 31. Thus the M.M.F.'s of the bias magnets 32 and 33 are in opposition to the M.M.F. of the probe 31.

The transducer 10 operates on the principle of periodically changing the reluctance of the magnetic path which includes the permanent magnet probe 31, the bias magnets 32 and 33, the pole pieces 13 and 14 with their windings 23 and 17, and the saturable core means 11, 11a with its driving winding 12. The reluctance change is produced by periodically saturating the saturable core means 11, 11a with current through the driving winding 12 supplied by the driving oscillator 27. If a net D.C. flux exists in the aforesaid magnetic path due to inequality of the magnetomotive forces of the permanent magnets 31–33 and the D.C. feedback winding 23, the magnitude of this net flux will be changed periodically by the reluctance changes. The changing flux linking the A.C. output winding 17 will induce a voltage in that winding. If the net flux in the magnetic path is zero, no voltage will be induced in the output winding 17. The output voltage in the presence of a net flux will be an A.C. voltage, having a frequency equal to the frequency of saturation of the saturable core 11 and a phase determined by the direction of the net flux.

When the permanent magnet probe 31 is in its reference or zero position, no output voltage will be produced, since that portion of the M.M.F. of the magnet probe 31 which is in the magnetic circuit is just equal and opposite to the M.M.F.'s of the bias magnets 32 and 33, and the net flux is zero with zero direct current in the feedback winding 23.

When the magnet probe 31 is moved from its reference or zero position, a net flux results which produces an A.C. output in the winding 17. This produces a direct feedback current through winding 23 which reduces the net flux to a negligibly small value. Thus, the transducer 10 will be maintained in a substantially zero flux condition for all positions of the probe 31, and permeability changes in the magnetic path will not produce a zero-offset.

To prevent transformer-type coupling between the driving winding 12 and the A.C. output winding 17, the driving winding 12 is placed on the auxiliary ring-shaped core 11a which is oriented so that the saturating flux passes through the saturable core 11 in a direction perpendicular to the net flux path. Because of this right-angle relation, no coupling exists between the windings 12 and 17.

Figure 2:
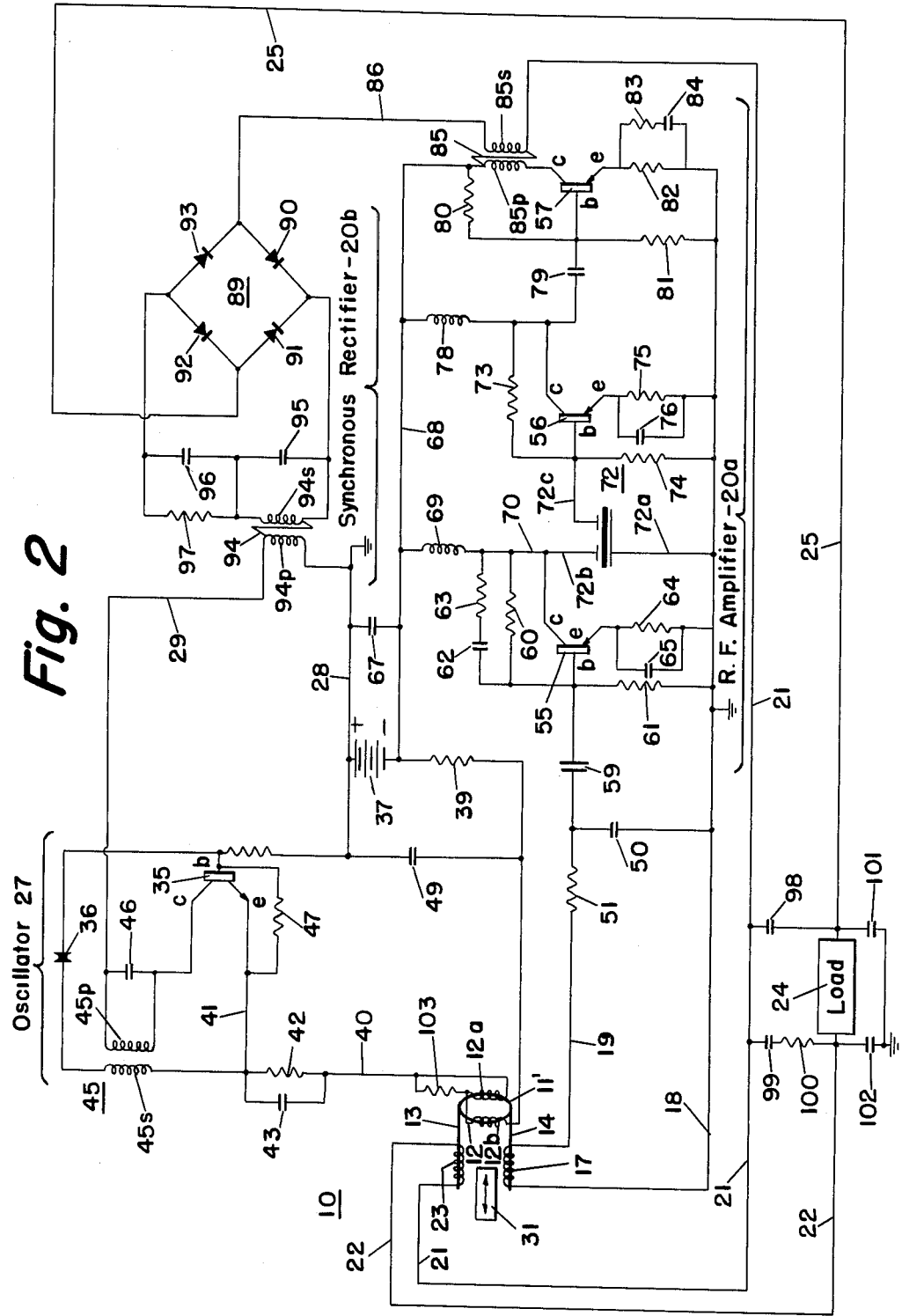
FIG. 2 is a schematic diagram of the electrical circuit for the transducers shown herein.

An alternative arrangement for preventing transformer-type coupling and which requires less driving M.M.F. than the one described in FIG. 1 is schematically illustrated in FIG. 2 where the driving winding 12 is placed symmetrically on opposite sides of an axis of the saturable core ring 11'. Such axis is parallel to the net flux path and the magnetic properties of the saturable core are symmetrical about this axis. Thus, there exists no coupling between the driving and output windings 12 and 17.

As later discussed in more detail, the output current through the load 24 varies linearly with the change in position of the magnet probe 31. The output current is substantially independent of changes in resistance in the load circuit and may be transmitted over a substantial distance to the load without loss of linearity.

By driving the saturable core to saturation only once per cycle of driving current, the fundamental frequency of the output will be the same as that for the driving current. This may be accomplished by using a unidirectional device in series with the driving winding 12. Although under these conditions a direct current flows in the driving winding 12, the aforementioned symmetry of the saturable ring 11' and its winding 12 prevents this direct current from producing a steady state error M.M.F. in the net flux path. If the saturable core is driven to saturation twice per cycle as would be the case with normal A.C. applied to the winding 12, the fundamental frequency of the output will be twice that for the driving current and a frequency doubler is required between the oscillator 27 and the synchronous rectifier portion 20b of block 20.

Since the output voltage of the transducer 10 is dependent on the rate of change of flux, it is dependent on frequency. With a fixed number of turns in the output winding 17, a fixed net flux and a constant driving waveform, the output voltage will vary directly with driving frequency of the oscillator 27. However, if the turns of the output winding 17 are varied to keep a constant reactance as the driving frequency is changed, the output voltage varies as the square-root of the driving frequency. These variations of voltage with frequency do not cause errors since the net flux output is kept at a null or zero.

The oscillator 27 includes a transistor 35 and is of the fixed frequency type. The oscillator 27 includes a piezo-electric unit 36 which may be of the type TF–01A manufactured by Clevite Electronic Components Division of Clevite Corporation and sold under the trademark "Transfilter." The piezo-electric unit 36 stabilizes the frequency of oscillation of the oscillator 27 and is the equivalent of a series-resonant circuit at the oscillating frequency of the oscillator. The piezo-electric unit 36 has a higher power handling capability than quartz crystals operating at the same frequency to provide greater driving power from the oscillator. The voltage for the oscillator 27 may be provided from any suitable source and has been illustrated as a battery 37, one end of which is connected to conductor 28 and the other end of which is in series with a dropping resistor 39 connected to one end of the winding 12 which is wrapped around the saturable core 11'. As previously described, the driving winding 12 is placed symmetrically around the opening in the ring 11' and the opposite end of winding 12 is connected to the emitter $e$ of transistor 35 by way of conductors 40 and 41. The conductors 40 and 41 are connected by way of a parallel circuit including a resistor 42 and a capacitor 43 which provide temperature stability for the oscillator current. The secondary winding 45s of a transformer 45 is connected in series circuit with the element 36 between the base $b$ and the emitter $e$ of transistor 35 to provide the necessary feedback for the oscillator 27. The primary winding 45p of transformer 45 and capacitor 46 are connected in parallel between conductor 29 and the collector $c$ of the transistor 35 and provide the tuned circuit for oscillator 27. A shunting resistor 47 is connected across the base-emitter junction and provides temperature compensation for that junction. An RF by-pass capacitor 49 is connected across the power supply 37.

The transistor 35 during its operation acts as a unidirectional current device supplying current to the saturating winding 12 which is of half-waveform for saturating the saturable core 11' once during each cycle of the oscillator 27. The oscillator 27 also supplies A.C. power to the synchronous rectifier 20b with the collector current from the transistor 35 being supplied to the synchronous rectifier 20b by way of conductors 28 and 29.

When an input signal is supplied to the system, the magnet probe 31 is moved from its reference or zero position along the longitudinal axis between the pair of poles 13 and 14 producing a net flux other than zero which in turn produces an A.C. output voltage in winding 17. This produces a signal to the input of the RF amplifier 20a by way of conductors 18 and 19 across which there is connected a capacitor 50 which cooperates with a resistor 51 in series with conductor 19 to provide the proper phasing for the A.C. input signal. It is to be noted that the conductor 18 is connected to ground. The RF amplifier 20a is of the three-stage type and includes transistors 55, 56 and 57. An input capacitor 59 is in series with conductor 19 and the base $b$ of transistor 55 and a pair of resistors 60 and 61 are provided for stabilizing the D.C. operating point of transistor 55. The capacitor 62 and resistor 63 provide an A.C. negative feedback for the transistor 55. The bias for the emitter

*e* of transistor 55 is provided by resistor 64 and capacitor 65. An RF by-pass capacitor 67 is connected across the battery 37 between conductors 28 and 68, the latter being connected to one end of an RF choke 69, the other end of which is connected to a conductor 70 connected with the collector *c* of transistor 55 for supplying operating power to the first stage. While the interstage coupling between the first and second stages could be any conventional frequency selective type, the interstage coupling shown is provided by a piezo-electric device 72. The device 72 is of the type TO–O1A manufactured by Clevite Corporation and sold under the trademark "Transfilter." Such devices are described in a paper entitled "Application of Piezoelectric Resonators to Modern Band-Pass Amplifiers" by Lungo and Henderson, presented at the IRE Convention at New York City in March 1958. This device 72 has its common terminal 72*a* connected to ground and its high impedance terminal 72*b* connected to the collector *c* of transistor 55 and its low impedance terminal 72*c* connected to the base *b* of transistor 56 to provide a tuned circuit coupling. The second stage of the amplifier 20*a* which includes transistor 56 is provided with resistors 73 and 74 which function in the same manner as resistors 60 and 61 previously described in connection with the first stage of the amplifier. Likewise the parallel resistor 75 and capacitor 76 in the connection to emitter *e* of the transistor 56 function in the same manner as resistor 64 and capacitor 65. An RF choke 78 is connected between conductor 68 and the collector *c* of transistor 56 similar to RF choke 69. The second and third stages of the amplifier 20*a* are coupled by way of a capacitor 79. The resistors 80 and 81 provide stabilization of the D.C. operating point for the transistor 57. The emitter *e* of transistor 57 is provided with a bias circuit including a resistor 82 across which is connected the resistor 83 in series with a capacitor 84. The primary winding 85*p* of the output transformer 85 is in series with the collector *c* of transistor 57 and is connected to the conductor 68. The secondary winding 85*s* of the transformer 85 is connected to the synchronous rectifier 20*b* and the feedback winding 23 by way of conductors 86 and 21 respectively.

The synchronous rectifier 20*b* includes a bridge network 89 comprising four rectifiers 90, 91, 92 and 93. The bridge 89 is driven from the output of oscillator 27 which is applied to the primary winding 94*p* of transformer 94. The secondary winding 94*s* of transformer 94 is connected by way of a phasing network including capacitors 95 and 96 and resistor 97 across conjugate points of the bridge 89. The bridge network 89 is such as to provide a low-impedance conductive path between conductors 86 and 25 during one-half of each cycle regardless of the output from the transformer 85. During the other half-cycle, the bridge 89 is biased in a non-conducting direction to provide a high impedance between conductors 86 and 25. The bridge 89 thus acts in manner similar to a single-pole switch operated in synchronism with the output from the oscillator 27. The presence of the bridge 89 provides a direct current output of polarity determined by the phase of the signal from the output winding 85*s* of transformer 85. The current from the bridge 89 may be traced by way of conductor 25 through the load 24 and a conductor 22, one end of the D.C. feedback winding 23 and thence through conductor 21 to the secondary winding 85*s* of transformer 85. A capacitor 98 is connected between conductors 21 and 25 and a capacitor 99 and resistor 100 are connected between conductors 21 and 22 to form a filter network for smoothing the one-halfwave rectified D.C. from the synchronous rectifier 20*b*. Capacitors 101 and 102 which are respectively connected between conductor 25 and ground and conductor 22 and ground provide low impedance to ground for radio-frequency signals while maintaining high impedance for D.C. and low-frequency signals.

From the foregoing discussion, it will be seen that the oscillator 27 has a dual purpose, namely, periodically to saturate the core 11′ by means of the winding 12 and also to provide the reference voltage for the synchronous rectifier 20*b*.

When the magnet probe 31 is moved from its reference or zero position, a net flux results which produces an A.C. output in the winding 17. This output is amplified by the amplifier 20*a* and the output is rectified by the synchronous rectifier 20*b* and fed back through the load 24 to the feedback winding 23 which produces a rebalancing M.M.F., reducing the net flux again substantially to zero. In this manner, the transducer 10 is maintained in a substantially zero flux condition for all positions of the probe 31. As a result of the rebalancing of the M.M.F. produced by the feedback current, the current through the load 24 is directly dependent upon the position of the probe 31.

With the magnet probe 31 in its zero position, it is possible that a net flux might be developed by the two coils 12*a* and 12*b* of driving winding 12 on the ring or the saturable core 11′ to produce by transformer action with the A.C. output winding 17 a voltage due to unbalance between the coils 12*a* and 12*b* of winding 12 or variations in characteristics of the magnetic ring 11′. To eliminate such voltage, a resistor may be connected across either half of the winding 12, such, for example, as illustrated by resistor 103 which is connected across coil 12*a*.

Figure 3:
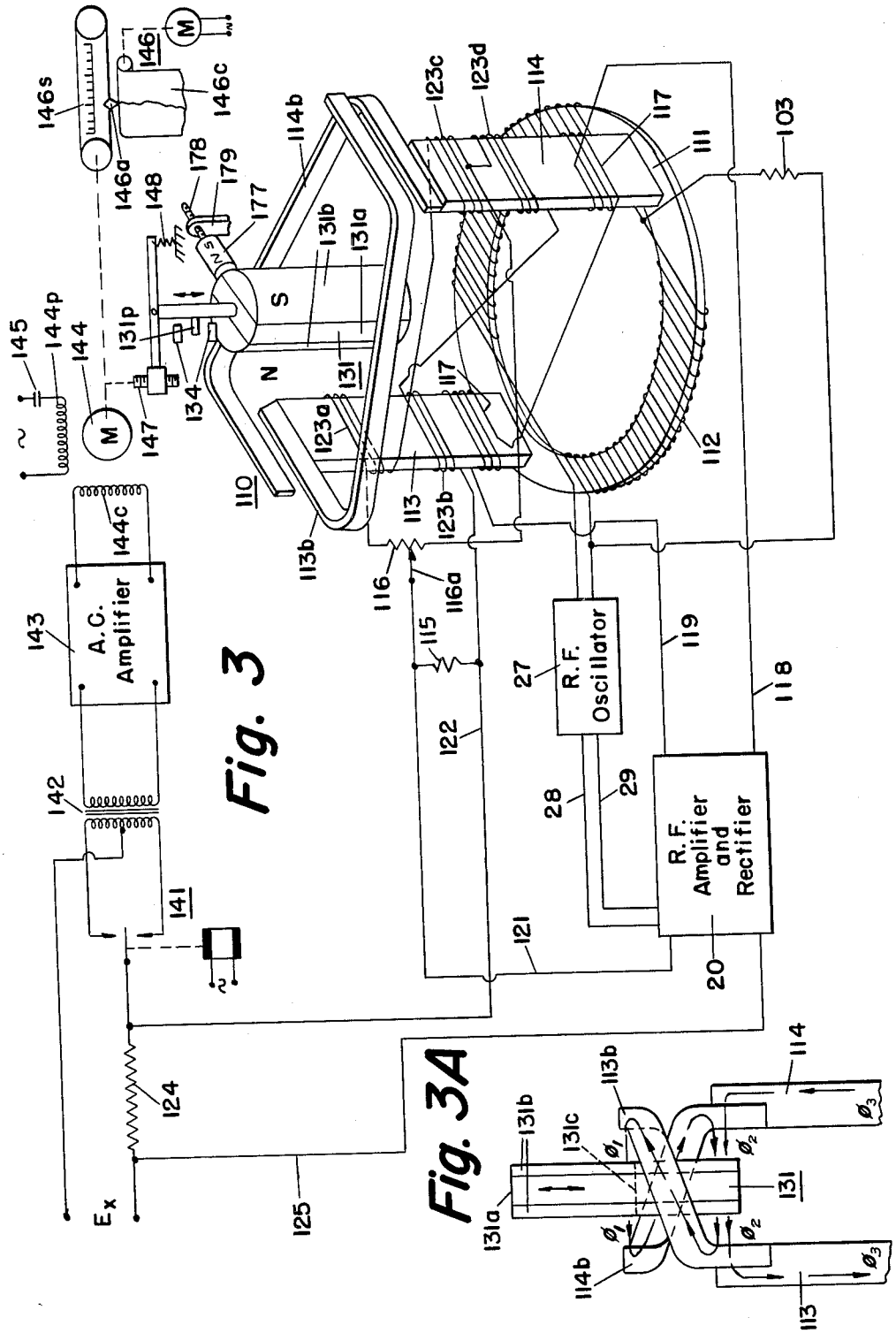
FIG. 3 is a schematic diagram of a modification of the transducer shown in FIG. 1 as applied to a rebalanceable recorder.

Referring to FIG. 3, there is schematically illustrated an electrical rebalancing recorder which includes as a portion thereof a transducer 110. The magnetic circuit for the transducer 110 comprises a saturable core in the form of a ring 111 on which there is wound a driving winding 112. A pair of poles 113, 114 project from the saturable core ring 111 similar to the transducer 10 previously described. The poles 113, 114 are provided with an A.C. output winding 117. The winding 117 is connected by way of conductors 118 and 119 to the input of the RF amplifier and synchronous rectifier schematically indicated by rectangle 20. One side of the output from the RF amplifier and synchronous rectifier 20 is connected by way of conductor 121 to an adjustable contact 116*a* of a span-setting resistance 116. The poles 113 and 114 are provided with a D.C. feedback winding 123 which is divided into four parts or coils 123*a*–123*d* two of which, 123*a*, 123*b*, are on pole 113 and the other two, 123*c*, 123*d*, are on pole 114. The resistor 116 is connected to the top end of coil 123*a* and to the bottom end of coil 123*c*, the other ends of coils 123*a* and 123*c* being connected to each other. The lower end of coil 123*c* is connected to the upper end of coil 123*d* which in turn is connected in series with coil 123*b*, the latter being connected by way of conductor 122 to one side of a load resistor 124. The other side of the load resistor 124 is connected by way of conductor 125 to the other side of the output of the RF amplifier and synchronous rectifier 20. The driving winding 112 is connected to the driving oscillator 27 which is also connected by way of conductors 28 and 29 to the synchronous rectifier portion of rectangle 20.

It will be recalled that the magnetic bias opposing the flux from the permanent magnet probe 31 in FIG. 1 was derived from separate permanent magnets 32 and 33 on the pair of poles 13 and 14 to establish the zero or reference position of the probe. With such an arrangement, variations of ambient temperature generally result in undesirable changes in the zero or reference position of the probe 31 due to dissimilar changes in the M.M.F. of the probe 31 compared with changes of the M.M.F. of the magnets 32 and 33. Thus, it is necessary to compensate the permanent magnets so that changes in ambient temperature will not produce large zero shifts and calibration changes in the transducer. Such compensation is extremely difficult in order to prevent zero and calibration shifts of the order of one-half percent when the temperature change is in the order of 200° F., with the latter being a temperature range normally expected to be encountered in the field by equipment of this type.

In the modification shown in FIG. 3, the magnetic bias for the transducer is supplied by the same permanent magnet 131 which produces the position or input information. By this method of biasing, it is possible to reduce the temperature effects to a much smaller value without any special compensation of the permanent magnet 131 because temperature variations of the M.M.F.'s are the same for both the position M.M.F. and the bias M.M.F.

As may be seen in FIG. 3, each of the poles 113 and 114 is provided with bias means in the form of helical-shaped extensions 113b and 114b. The extensions 113b and 114b are of a high permeability material, such, for example, as "Hy-Mu-80" which is a nickel-molybdenum-iron alloy manufactured by Carpenter Steel Company. This material has a high permeability at low flux densities and has a low coercive force. Each of the extensions 113b, 114b project from the respective one of the pole pieces 113 and 114 and extend around opposite sides of the longitudinal axis between the pair of pole pieces with the distal ends of the extensions 113b and 114b being directly opposite each other and in line with the other of the pole pieces.

As may be seen in FIG. 3A, the bias extensions 113b and 114b are arranged to form a magnetic bridge which receives flux from one end of the permanent magnet 131 and from a second location on magnet 131. In FIG. 3A, the flux in the air gap between the pair of opposing pole faces formed by the bias extensions 113b and 114b at the upper portion of the magnet is identified by the symbol $\phi_1$ and the flux in the air gap between the pair of opposing pole faces formed at the lower ends of the bias extensions 113b and 114b and the poles 113 and 114 is identified by the symbol $\phi_2$. The flux traversing the poles 113 and 114 and the saturating ring 111 is identified by the symbol $\phi_3$. The bias extensions 113b and 114b are so shaped that the spaced locations on the permanent magnet 131 aid each other in producing circulating flux through the bias extensions and their associated air gaps. The flux $\phi_2$ is the algebraic sum of the flux $\phi_1$ and $\phi_3$. Thus, when $\phi_1$ is equal to $\phi_2$, then $\phi_3$ is zero. The bias extensions 113b and 114b are arranged so that this condition occurs for the reference or zero position of the magnet probe 131. For any other position of the magnet probe 131, $\phi_2$ will be either greater or less than $\phi_1$, and thus $\phi_3$ will have a corresponding magnitude and direction. The transducer 110 then operates on the flux $\phi_3$ in the manner described in connection with FIGS. 1 and 2.

As shown in FIG. 3A, the permanent magnet probe has a length substantially greater than the length of the bias extensions 113b and 114b along the axis of the transducer. In this arrangement, the flux $\phi_1$ is derived from the central portion of the permanent magnet probe 131 and is thus independent of the magnet position. The flux $\phi_2$ is derived from the distal or lower end of the permanent magnet probe 131 and varies linearly with magnet position. As may be seen in FIG. 3, spaced stop members 134 are positioned on opposite sides of a projection 131p carried by probe 131 so that the fringing fields at the distal and proximal ends of the probe 131 always operate in uniform magnetic environments to provide linearity. The stop members 134 limit motion of the distal end of the probe 131 between the poles 113 and 114 and prevent this end of the probe 131 from approaching the ends of the poles by a distance less than the length of the air gap therebetween and prevents the proximal end from approaching the ends of the pole piece extensions. The permanent magnet probe 131 may be provided with soft iron pole pieces 131b which are disposed on opposite sides of the permanent magnet core 131a and insure a uniform distribution of magnetic flux along the length of the probe 131 to further insure linearity between the change of flux in the poles and extensions and displacement of the probe 131.

While the permanent magnet probe 131 has been illustrated in FIG. 3A as being much longer than the axial length of the helical-shaped extensions 113b and 114b, it is to be understood that the probe may be shorter than shown and that the upper end of the probe 131 may terminate at the dotted line 131c. With this arrangement, the fluxes introduced into the magnetic circuit will be derived from both ends of the permanent magnet probe and both will be subject in opposite sense to linear variations with respect to magnet position as previously described in connection with the distal or lower end of the permanent magnet probe 131. This latter arrangement provides increased sensitivity for the transducer 110.

In the electrical rebalancing recorder shown in FIG. 3, an unknown D.C. signal $E_x$ to be recorded is applied to a vibrator 141 of any suitable type for converting direct current to alternating current. The resulting alternating current is applied by way of a transformer 142 to an A.C. amplifier 143, the output of which is utilized to energize a control winding 144c of a motor 144. The motor 144 is provided with a power winding 144p which is energized from an A.C. source connected by way of a phasing capacitor 145. The motor 144 is adapted to position a pen and index 146a of a recorder 146 relative to a chart 146c and a scale 146s. The motor 144 concurrently by means of the threaded drive 147 moves the magnet probe 131 along the longitudinal axis between the pair of poles 113 and 114 against the bias of a spring 148. The spring 148 is utilized to eliminate the effects of backlash or lost motion in the mechanical drive from the motor 144 to the probe 131.

Upon change in the axial position of the permanent magnet probe 131, by rotation of the balancing motor 144 but without rotation of probe 131, the M.M.F. introduced into the magnetic circuit by the lower end of probe 131 will be changed, producing a net flux which is other than zero and producing an A.C. signal as a result of periodic saturation of the saturable core 111 by the winding 112. The A.C. signal from winding 117 is applied to the input of the RF amplifier and synchronous rectifier 20, the output of which is connected to the feedback winding 123 and to the resistor 124 which is in the input circuit of the recorder to produce a rebalancing electrical feedback signal. When the rebalancing electrical feedback signal is equal to and opposite from the unknown electrical signal $E_x$, the rebalancing motor 144 will stop and thus the index and pen assembly 146a will be positioned relative to the chart 146c and scale 146s as determined by the magnitude of the signal $E_x$.

The span-setting resistor 116 provides a means for adjusting the relation between the magnitudes of input signals $E_x$ and the corresponding displacements of the pen-index assembly 146a from its zero signal position. It thus provides adjustment for the magnitude of $E_x$ corresponding to full-scale displacement of the pen-index assembly, i.e., the span of the recorder. Span adjustment is effected by changing the position of adjustable contact 116a along span-setting resistor 116 to alter the fraction of the D.C. output current from the synchronous demodulator which flows in the pair of feedback coils 123a, 123c. Coils 123a and 123c are connected so that they are series-aiding to produce flux in one direction in the magnetic circuit including poles 113 and 114 and the saturable ring core 111. Coils 123b and 123d are connected so that they are series-aiding to produce flux in the opposite direction to that produced by coils 123a and 123c. When adjustable contact 116a is at the lower end of resistor 116, all the D.C. output current flows through coils 123b and 123d and no opposing M.M.F. is produced by coils 123a and 123c. With this adjustment, the direct output current has maximum effectiveness in producing M.M.F. to balance the M.M.F. of the magnet probe 131.

The output current necessary to develop the balancing electrical signal across resistor 124 required by an input signal $E_x$ is thus produced by a relatively large displacement of the magnet probe and the pen-index assembly from their zero reference positions, i.e., the recorder span is minimum. Adjustment of contact 116a upward to a new position on resistor 116 causes a fraction of the D.C. output current to flow through coils 123a and 123c. With this adjustment, an M.M.F. is produced by coils 123a and 123c to oppose the balancing M.M.F. of coils 123b and 123d, thus reducing the effectiveness of the output current in balancing the M.M.F. of the magnet probe when the probe is displaced from its zero-reference position. The output current necessary to develop the balancing electrical signal across resistor 124 required by an input signal $E_x$ is now produced by a relatively smaller displacement of the magnet probe 131 and pen-index assembly 146a from their zero-reference positions, i.e., the span of the recorder has been increased. Span-adjusting resistor 116 can readily produce span adjustments having ratios of 4:1. Other methods of span adjustment based on controlling the effectiveness of the output current in producing balancing M.M.F. are possible. Simple shunting of the feedback windings by an adjustable resistor is one such method: however, with this method ratios as large as 4:1 in span adjustment are not as easily obtained. Magnetic shunts on the magnetic circuit of the transducer can also be used for span adjustment. Span adjustment over large ratios can also be obtained by a different method by making resistor 124 adjustable. The span adjustments do not effect the zero-reference position of the magnet probe 131 and pen-index assembly 146a.

Associated with the span-adjusting resistor 116 there may be provided resistance means for varying the span of the sensor with changes of ambient temperature to compensate for the effects of ambient temperature changes on other elements in the system. In the system of FIG. 3, there has been shown a shunting resistor 115 which may be provided with a temperature coefficient to effect the desired temperature compensation.

Adjustment of the position of pen-index assembly 146a relative to chart 146c and scale 146s for zero input signal can be provided by a second permanent magnet which is adjustable in position relative to the magnetic circuit containing poles 113 and 114. One arrangement is illustrated by zero-adjusting magnet 177 in FIG. 3. Permanent magnet 177 is arranged with north and south poles as indicated by N and S respectively, and is mounted by a screw 178 operating in a fixed support 179 so that it can move in its axial direction. The M.M.F. of magnet 177 produces a relatively small flux in pole extensions 113b and 114b which can aid or oppose the flux produced by magnet probe 131 in pole extensions 113b and 114b, depending upon the adjustment of screw 178. The relatively small flux in pole extensions 113b and 114b from magnet 177 therefore can effectively increase or decrease the biasing effect of magnet 131 which establishes the zero-reference position of magnet probe 131 as explained above. As screw 178 is advanced, the north pole N of magnet 177 is moved closer to pole extension 114b. It is also moved closer to pole extension 113b, but for the first part of its travel it remains at a relatively great distance from pole extension 113b. Flux is thus produced by magnet 177 in pole 114b in the same direction as the flux produced by magnet 131 and the biasing effect is increased. This requires that the lower end of magnet 131 move downward into greater engagement with poles 113 and 114 to produce zero net flux in those poles, i.e., the zero reference position of magnet 131 and pen-index assembly 146a has been moved "upscale." Further adjustment of screw 178 to move magnet 177 toward the axis of the transducer increases the "upscale" displacement of the zero-reference position until at one position of magnet 177 the upscale displacement is maximum.

Continued adjustment of the position of magnet 177 toward the axis of the transducer brings its north pole toward a position adjacent the part of pole extension 114b which is parallel to the motion of magnet 177. As magnet 177 approaches this position, the distance of its north pole N from pole extension 114b becomes relatively independent of the position of the magnet, while the distance of its north pole N from pole extension 113b is still strongly dependent on the magnet position. Therefore, as magnet 177 is moved toward the axis of the transducer from the point of maximum upscale zero-reference position, the flux from its north pole N into pole extension 113b increases more rapidly that that into pole extension 114b. The net flux in pole extensions 113b and 114b from magnet 177 is thus reduced and the effective bias is reduced. The zero-reference position is moved "downscale" from its maximum upscale position. Still further adjustment of magnet 177 toward the axis of the transducer will cause magnet 177 to approach a position in which its south pole S is closer than its north pole N to pole extension 114b, while its north pole N is closer than its south pole S to pole extension 113b. When this condition is reached, the effect of magnet 177 is to decrease the effective bias by introducing flux in pole extensions 113b and 114b which opposes the flux from magnet 131. As the effective bias is decreased by further adjustment of magnet 177 in the same direction, the position of the lower end of magnet probe 131 for zero net flux in poles 113 and 114 moves upward into less engagement with poles 113 and 114. The zero-reference position of pen-index 146a may thus be moved "downscale" beyond the position it would occupy if no zero adjusting magnet 177 were present.

Zero adjustment can be provided by other methods as for example by passing a stable adjustable current through a winding on poles 113 and 114. Such zero adjustments have no effect on the span.

Figure 4:
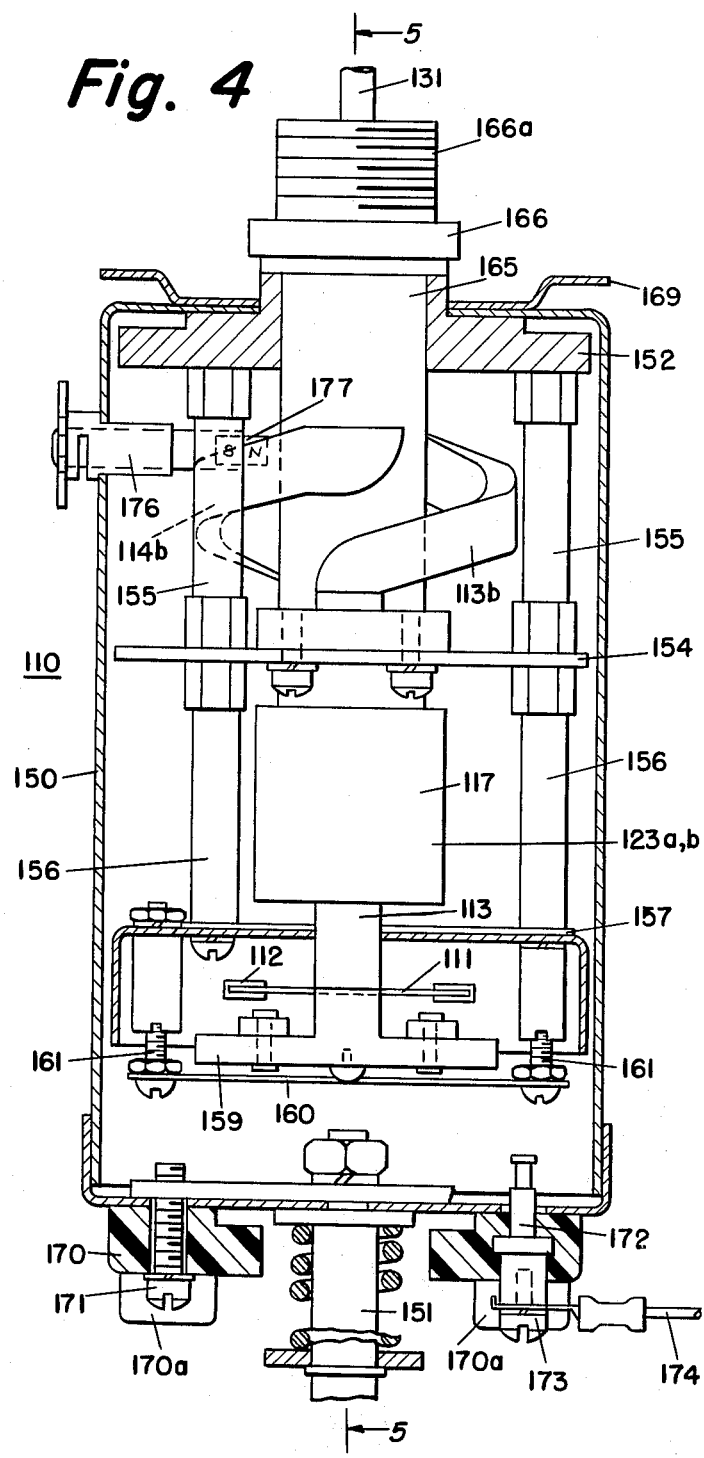
FIGS. 4 and 5 are vertical sectional views of one form of the transducer schematically shown in FIG. 3.
Figure 5:
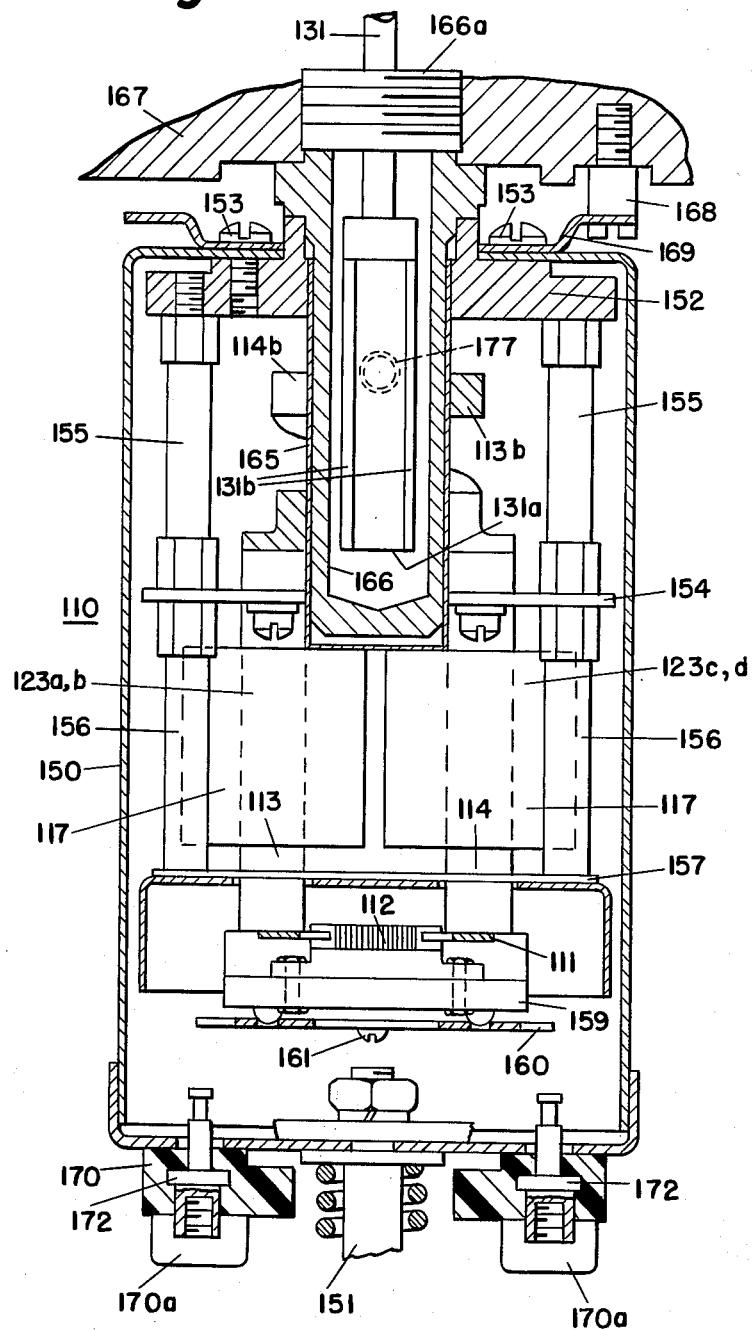

Referring to FIGS. 4 and 5, there is illustrated a commerical form of the transducer 110 embodying the principles schematically illustrated in FIGS. 3 and 3A. As may be seen in FIGS. 4 and 5, the transducer 110 is provided with a housing 150 which is adapted to be supported at its lower end by a member 151. At the other end of the housing, there is provided a plate member 152 which is connected to the housing by screws 153 and which supports in depending relation a disc 154 by means of connecting posts 155. The disc or support 154 in turn has connected thereto rod members 156 which support a lower disc member 157. The disc members 154 and 157 cooperate to support the pair of the poles 113 and 114, the upper ends of which are provided with the helical-shaped extensions 113b and 114b, FIG. 4. The saturable core ring 111 which carries the driving winding 112 is held against the lower ends of the pole pieces 113 and 114 by means of a supporting member 159 which is held in place by a retaining member 160 which is secured to the disc 157 by screws 161. The pole pieces 113 and 114 are provided with their respective portions 123a–123d of the D.C. feedback winding and the A.C. output winding 117. A well 165 is positioned along the longitudinal axis of the transducer and between the poles 113 and 114. The well 165 is adapted to receive the permanent magnet probe 131 for movement along the longitudinal axis. The probe does not rotate but instead moves in the manner of a plunger. The probe 131 may be sealed within an enclosure 166, which may be pressurized, to eliminate the necessity of transmitting mechanical motion through a pressurized wall. The upper end of the enclosure 166 is threaded at 166a and is adapted to be received in a correspondingly-threaded opening in a housing 167 of the primary motion-producing device. The housing 150 of the transducer 110 is secured to the housing 167 by screws 168 which extend through slots in hanger member 169.

The lower end of the transducer 110 is provided with a contact block 170 which is secured to the housing 150 by a plurality of screws 171. The contact block 170 is made from electrical insulating material and supports a plurality of contact members 172 around its circumference. The contact members 172 are separated from each other by projections or rib members 170a which extend radially about the center of the contact block 170. The contact members 172 have one end which extends inside the housing 150 for electrical connection with the coils 123a–123d and windings 112 and 117. The opposite ends of the contact members 172 are adapted to receive screw members 173 for the connection of external leads, one of such leads 174 being illustrated in FIG. 4. These leads are connected to the elements illustrated as blocks in FIG. 3.

As may be seen in FIG. 4, there is illustrated a holder 176 which extends through the side wall of the housing 150 for the transducer and supports within the housing a permanent magnet 177. The permanent magnet 177 is relatively short and is positioned over the helical-shaped extension 114b with the north pole end of the magnet 177 adjacent the well 165 for receiving the probe 131. As may be seen in FIG. 5, the magnet 177 is positioned at right angles with respect to the poling of the permanent magnet probe 131. The magnet 177 is adjustably positioned by means of the holder 176 and is utilized to adjust the zero or reference position of the probe 131 of the transducer. The adjustable magnet 177 corrects for small variations in the reference position arising from manufacturing tolerances of both the transducer and the input device.

Figure 6:
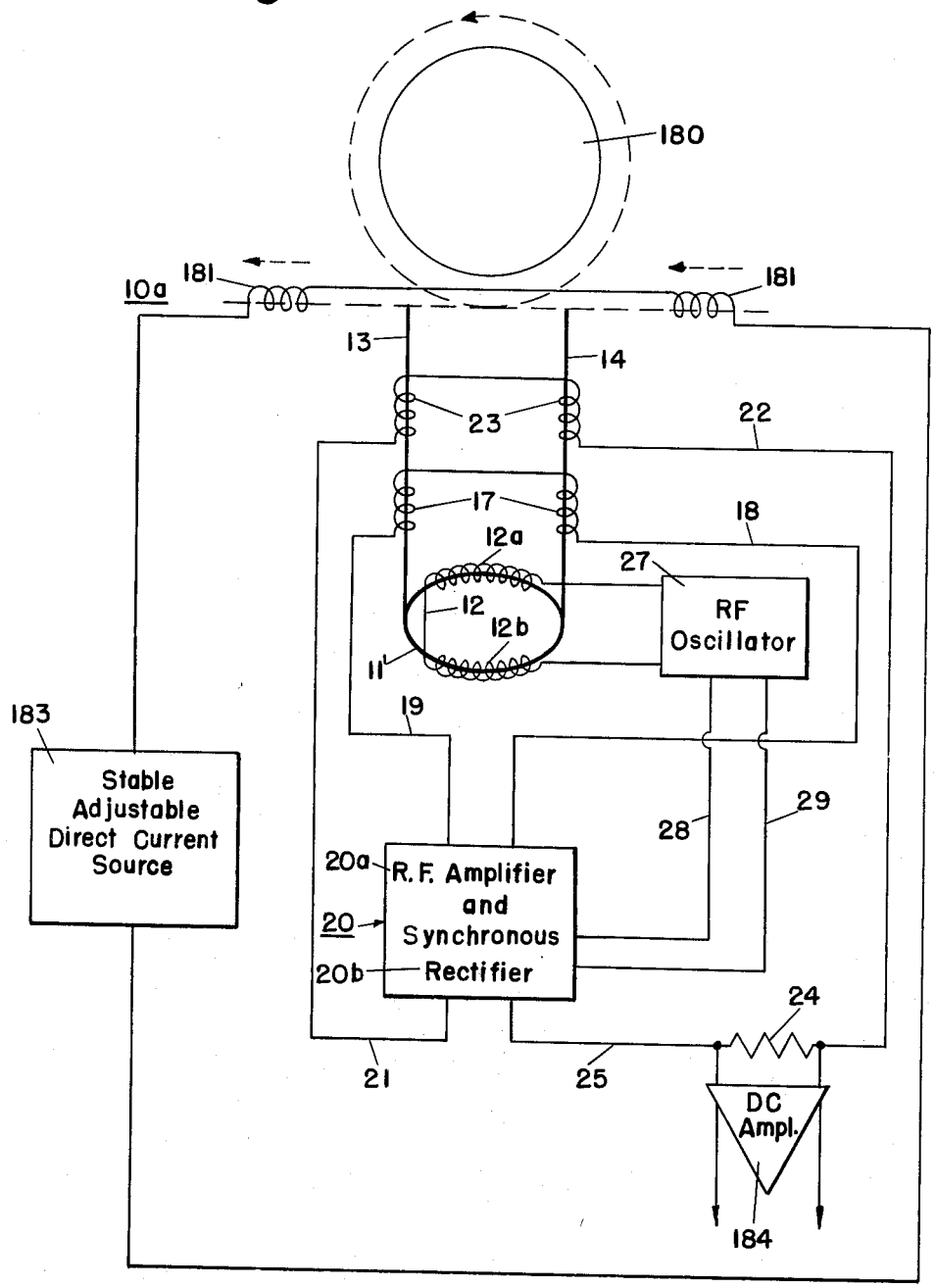
FIG. 6 is a schematic diagram of another modification of the invention.

While the invention as thus far described has been directed to the use of a mechanical input utilizing a permanent magnet probe, it is to be understood that certain aspects of the invention are applicable to transducers in which the input M.M.F. is derived from means other than a permanent magnet. Such an arrangement is illustrated in FIG. 6, where the input M.M.F. is derived from an electrical conductor, such as a bus bar 180, the axis of which is perpendicular to the longitudinal axis of the pair of poles of the transducer 10a. The transducer 10a is similar to that shown in FIG. 2 and includes a pair of poles 13 and 14 having at their lower ends a saturable core ring on which is wound a driving or saturating winding 12 having divided portions 12a and 12b. The poles 13 and 14 are provided with an A.C. output winding 17 which is connected by way of conductors 18 and 19 to the input of the RF amplifier 20a and synchronous rectifier 20b schematically indicated by rectangle 20. One side of the output from the RF amplifier and synchronous rectifier 20 is connected by way of conductor 21 to one end of the D.C. feedback winding 23 on poles 13 and 14. The other end of the feedback winding is connected by conductor 22 to the load output 24, the other side of which is connected to the other side of the output of RF amplifier and synchronous rectifier 20 by conductor 25. The driving winding 12 is connected to the driving oscillator 27 which is also connected by way of conductors 28 and 29 to the synchronous rectifier portion 20b of rectangle 20.

At the upper ends of the pole pieces 13 and 14, there is provided bias means in the form of a coil 181 through which passes a stable adjustable reference direct current supply illustrated from a suitable stabilized direct current supply illustrated by rectangle 183. The coil 181 is mechanically rigid and supported at a predetermined distance from the center of the current bus bar 180. The reference coil 181 may be toroidal in form.

With the arrangement shown in FIG. 6, there can be obtained precise current control of the current in bus bar 180. Such control is based on sensing any difference between a preselected fraction of the total M.M.F. produced by the controlled current through member 180 and the M.M.F. produced by the stable direct current passed through the reference coil 181. Any difference in these magnetomotive forces produces control action to readjust the magnitude of the controlled high current in bus bar 180. The circular broken line arrow represents the magnetic field produced by the controlled current in the bus bar 180 and the straight broken line arrows represent the magnetic field of the reference current in coil 181. It will be noted that the directions of these fields are such as to oppose each other in the region at the ends of poles 13 and 14.

The transducer 10a forms a closed loop feedback system which produces a direct-current output across resistor 24 proportional to the M.M.F. unbalance between the controlled and reference currents. An M.M.F. unbalance produces flux through the magnetic circuit of the transducer 10a which is modulated by periodic saturation of the ring 11'. The resulting flux changes induce alternating voltages in the A.C. output winding 17 linking the magnetic circuit. These voltages are amplified and demodulated by the unit 20 to produce the direct-current output. The direct-current output from unit 20 is passed through the feedback windings 23 linking the magnetic circuit to restore the magnetic circuit essentially to the same conditions which existed before the M.M.F. unbalance, assuring that the output direct current is a measure of the M.M.F unbalance. The output direct current can thus be used to provide signals for the remainder of the control equipment. The output across the load 24 has been illustrated as being applied to a D.C. amplifier 184. Such amplifier 184 preferably is a stable, relatively wideband D.C. amplifier with moderate gain and is used to raise the control signal level to that needed for control of the generator means which produces the current through the bus bar 180. The desired magnitude of current through the bus bar 180 can be set by various methods. For example, it may be done by changing the magnitude of the current flowing through the reference coil 181 from the stable direct-current source 183, by adjusting the position of the transducer 10a and reference coil 181 relative to the bus bar 180, or by other means for changing the reference M.M.F.

It shall be understood the invention is not limited to the specific arrangements shown, and that changes and modifications may be made within the scope of the appended claims.

What is claimed is:

1. A transducer comprising:
   a magnetic bridge circuit having a single source of M.M.F. and a closed magnetic loop circuit including two pairs of opposing pole faces, said single source of M.M.F. being in series-aiding relation between said two pairs of pole faces in said magnetic loop circuit, said single source of M.M.F. having a variable effect between one of said pairs of pole faces,
   a detecting branch for said magnetic loop circuit connected across one of said pairs of pole faces, said detecting branch having a zero flux level when the effect of said single source of M.M.F. is the same at said two pairs of pole faces,
   means for periodically saturating a portion of said detecting branch, and
   a sensing coil associated with said detecting branch for producing a signal in accordance with the change in flux level in said detecting branch due to the periodic saturation.

2. A transducer according to claim 1 for use in the control of the magnitude of a condition including means responsive to said magnitude of said condition for relatively varying the magnitude of the M.M.F. appearing between said two pairs of pole pieces in said magnetic loop circuit.

3. A transducer according to claim 1 for use in the control of the magnitude of a condition wherein said single source of M.M.F. is a permanent magnet positioned by means responsive to said magnitude of said condition for relatively varying the magnitude of the M.M.F. appearing between said two pairs of pole pieces in said magnetic loop.

4. A transducer having a magnetic circuit comprising: saturable core means including a ring-shaped portion having a driving winding thereon,
a pair of spaced pole pieces projecting from said saturable core means,
input means for producing an M.M.F. to establish a variable flux level in said magnetic circuit,
bias means associated with said pair of pole pieces for producing predetermined opposing flux in opposition to the established variable flux in said magnetic circuit to provide a reference flux level for said input means at which the output from said transducer is zero,
an output winding on a portion of said magnetic circuit responsive to a net flux level other than zero to produce a signal,
a feedback winding on said pair of pole pieces, and
amplifying means having its input circuit connected to said output winding and its output connected to said feedback winding to restore the net flux level substantially to zero in response to said signal.

5. A transducer according to claim 4 wherein said driving winding is energized from an A.C. signal for periodically saturating said saturable core means, and wherein said amplifying means includes an A.C. amplifier and a synchronus rectifier in its output for producing a D.C. signal in said feedback winding.

6. A transducer according to claim 4 in which said input means includes a permanent magnet positioned between said pole pieces for producing a change in net flux in said magnetic circuit.

7. A transducer according to claim 5 including a load connected in series circuit between said feedback winding and said synchronous rectifier.

8. A transducer according to claim 7 including variable resistance means in circuit with said feedback winding for adjusting the relation between the input to said transducer and a current in said load.

9. A transducer according to claim 5 including an R.F. oscillator for saturating said core means once during each cycle and for driving said synchronous rectifier.

10. A transducer according to claim 4 wherein said driving winding includes two portions disposed on opposite sides of said ring-shaped portion, and balancing resistance means connected across one of said portions of said driving winding.

11. A transducer according to claim 4 wherein said bias means is associated with the ends of said pair of pole pieces and comprise permanent magnet means.

12. A transducer according to claim 6 including a second permanent magnet positioned relative to said first-named permanent magnet for adjusting the zero position of said first-named permanent magnet.

13. A magnetic circuit suited for use in a transducer or the like associated with a source of M.M.F. comprising saturable core means including a ring-shaped portion, a pair of spaced high permeability pole pieces projecting from said saturable core means, and bias means comprising helical-shaped extensions of each of said pole pieces, each of said extensions projecting from the respective one of said pole pieces and extending around the opposite sides of the longitudinal axis between said pair of pole pieces with the ends of said extensions being in line with the other of said pole pieces, said source of M.M.F. comprising a magnet disposed along the longitudinal axis and polarized transverse to the axis.

14. An electrical rebalancing recorder including an input circuit to which an unknown electrical signal and a rebalancing electrical feedback signal are adapted to be applied, a rebalancing motor responsive to the difference between said electrical signals, a permanent magnet probe positioned by said motor relative to a magnetic circuit for varying the M.M.F. introduced into said magnetic circuit, said magnetic circuit comprising saturable core means including a ring-shaped portion having a driving winding thereon, an oscillator for periodically driving said saturable core means to saturation, a pair of spaced high permeability pole pieces projecting from said saturable core means, bias means associated with the ends of said pair of pole pieces for establishing a reference position for said permanent magnet probe at which there is zero net flux through said magnetic circuit, an A.C. output winding on a portion of said magnetic circuit for providing as a result of said periodic saturation an A.C. signal when the net flux is other than zero, a feedback winding on said pair of pole pieces, amplifying means having its input connected to said output winding and its output connected to said feedback winding, and resistance means connected to the output of said amplifier and to said input circuit of said recorder for producing said electrical feedback signal.

15. A transducer having a magnetic circuit comprising:
saturable core means including a ring-shaped portion having a driving winding thereon,
a pair of spaced pole pieces projecting from said saturable core means,
bias means associated with said pair of pole pieces, said bias means comprising helical-shaped extensions of high permeability for each of said pole pieces, each of said extensions projecting from the respective one of said pole pieces and extending around opposite sides of the longitudinal axis between said pair of pole pieces with distal ends of said extensions being in line with the other of said pole pieces,
means for producing an M.M.F. to establish a variable flux level in said magnetic circuit between the ends of said pole pieces and the distal ends of said extensions,
an output winding on a portion of said magnetic circuit,
a feedback winding on said pair of pole pieces, and
amplifying means having its input circuit connected to said output winding and its output connected to said feedback winding.

16. A transducer having a magnetic circuit comprising:
saturable core means including a ring-shaped portion having a driving winding thereon,
a pair of spaced pole pieces projecting from said saturable core means,
bias means associated with said pair of pole pieces, said bias means comprising helical-shaped extensions of high permeability for each of said pole pieces, each of said extensions projecting from the respective one of said pole pieces and extending around opposite sides of the longitudinal axis between said pair of pole pieces with the distal ends of said extensions being directly opposite each other and in line with the other of said pole pieces,
means for producing an M.M.F. to establish a variable flux level in said magnetic circuit between the ends of said pole pieces and the distal ends of said extensions,
an output winding on a portion of said magnetic circuit,
a feedback winding on said pair of pole pieces, and
amplifying means having its input circuit connected to said output winding and its output connected to said feedback winding.

17. A transducer having a magnetic circuit comprising:
saturable core means including a ring-shaped portion having a driving winding thereon,
a pair of spaced pole pieces projecting from said saturable core means,
bias means associated with said pair of pole pieces, said bias means comprising helical-shaped extensions of high permeability for each of said pole pieces, each of said extensions projecting from the respective one of said pole pieces and extending around opposite sides of the longitudinal axis between said pair of pole pieces with the distal ends of said extensions being in line with the other of said pole pieces, means for producing an M.M.F. to establish a variable flux level in said magnetic circuit including a first permanent magnet position for movement along said longitudinal axis between said pair of pole pieces for producing a change in net flux in said magnetic circuit, an output winding on a portion of said magnetic circuit, a feedback winding on said pair of pole pieces, amplifying means having its input circuit connected to said output winding and its output connected to said feedback winding, and a second permanent magnet positioned relative to one of said extensions of said pole pieces for adjusting the zero position of said first-named permanent magnet.

References Cited by the Examiner
UNITED STATES PATENTS 2,053,154  9/1936  Pierre _____ 324—117
2,928,048  3/1960  Postal _____ 324—99

References Cited by the Applicant
FOREIGN PATENTS 828,030  2/1960  Great Britain.

WALTER L. CARLSON, *Primary Examiner.*
BENNETT G. MILLER, *Examiner.*